Nov. 5, 1940.   R. W. LOHMAN   2,220,788
METHOD AND APPARATUS FOR INVESTIGATING SUBTERRANEAN
STRATA BY MEANS OF ELECTROMAGNETIC MEASUREMENTS
Original Filed June 24, 1935    2 Sheets-Sheet 1
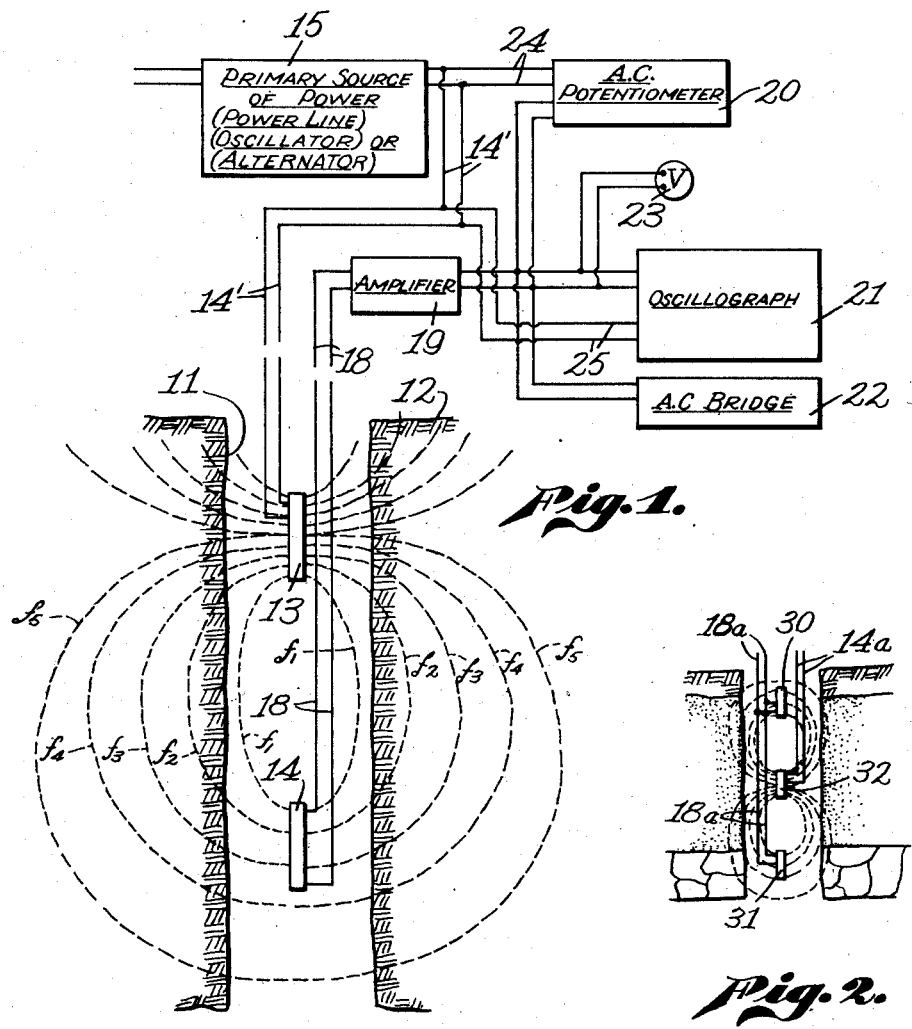
Fig. 1.
Fig. 2.
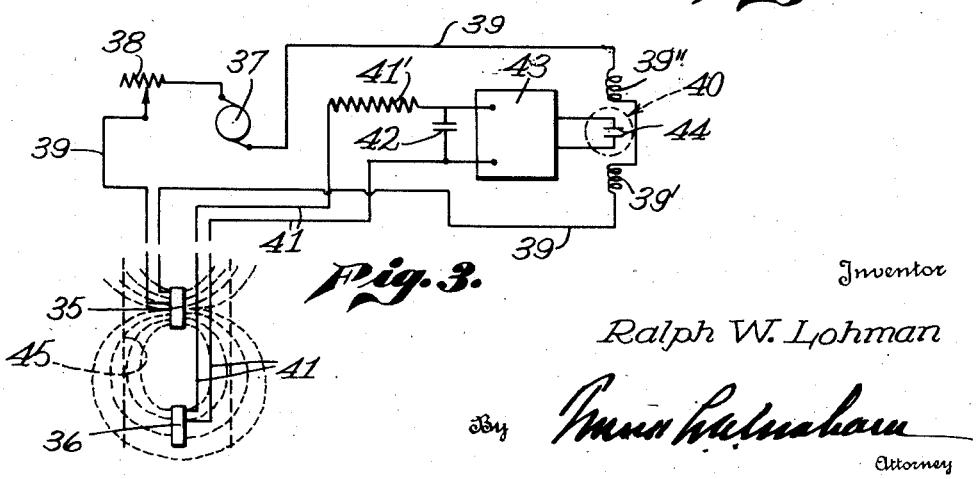
Fig. 3.
Inventor
Ralph W. Lohman
By [signature]
Attorney

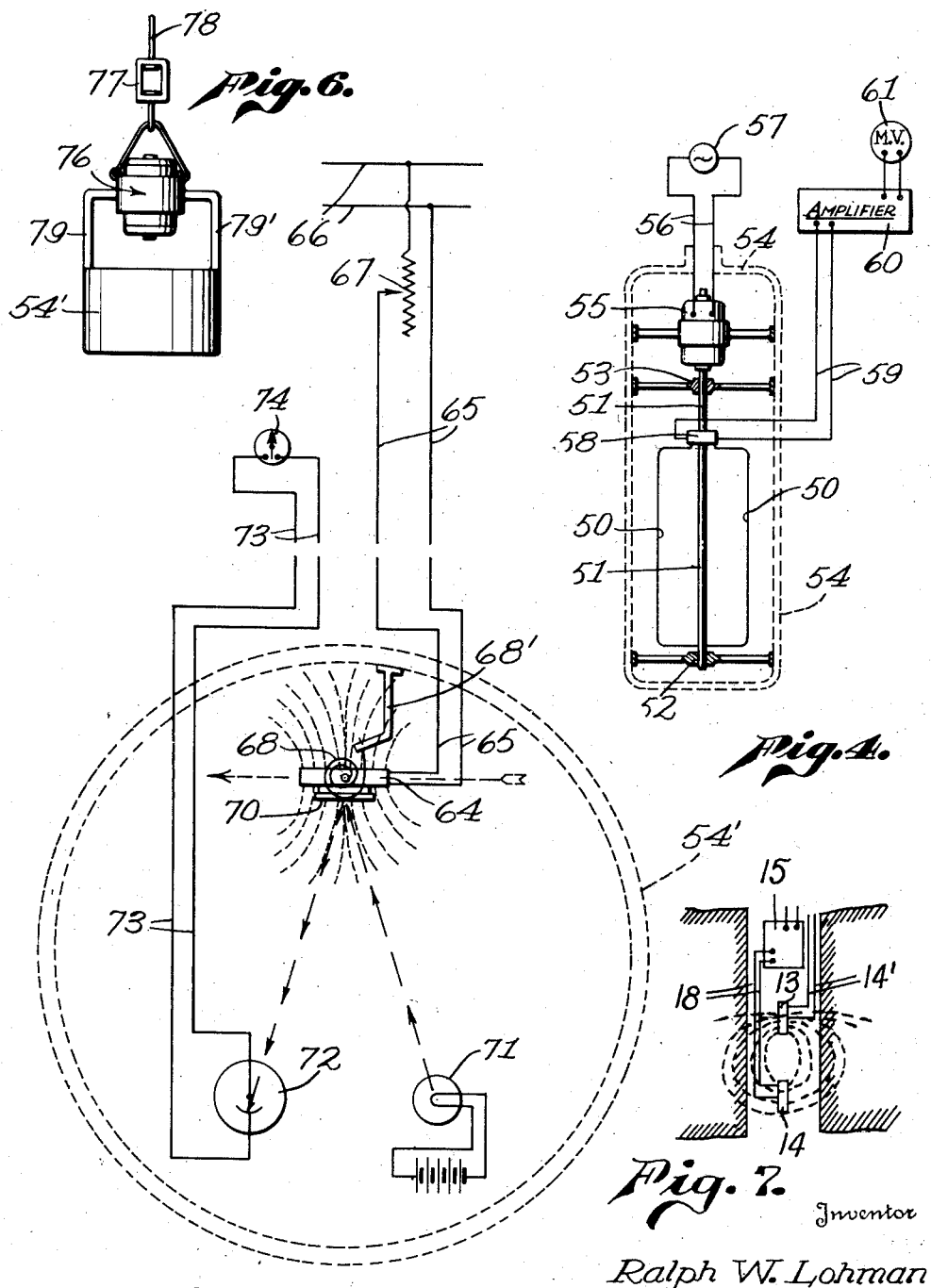

Patented Nov. 5, 1940

2,220,788

UNITED STATES PATENT OFFICE 2,220,788

METHOD AND APPARATUS FOR INVESTIGATING SUBTERRANEAN STRATA BY MEANS OF ELECTROMAGNETIC MEASUREMENTS

Ralph W. Lohman, South Pasadena, Calif., assignor, by mesne assignments, to Schlumberger Well Surveying Corporation, Houston, Tex., a corporation of Delaware Application June 24, 1935, Serial No. 28,074
Renewed January 26, 1940

13 Claims. (Cl. 175—182)

This invention has to do in a general way with the investigation of subterranean formations adjacent a bore hole with a view to determining the character and contents of sub-surface strata after the bore hole has been drilled and without the necessity of taking cores.

The invention relates more specifically to methods for making investigations of the general character above referred to in which electrical measurements and indications are obtained at the surface of the ground, such measurements and indications being obtained by influencing, with magnetic lines of force, an electromagnetic element which is lowered through the bore hole and electrically measuring or indicating the result of such influence at the surface of the ground, thereby obtaining a sensible indication or a graphic record which is indicative of the character and contents of the sub-surface strata through which the element is travelling.

It therefore becomes a primary object of this invention to produce a method, and an apparatus for practicing the same, whereby the measurements and indications obtained are the result of several unique characteristics of the strata. In pursuit of this object, I have discovered that the capability of an underground formation to transmit magnetic lines of force is an individual function of the character and contents of such formation and I propose to take advantage of this fact in obtaining electrical indications and measurements at the surface of the ground which are commensurate with the magnetic flux-density of any particular strata and are, therefore, a direct indication as to the character and contents of such strata.

The magnetic flux for obtaining such measurements may be that resulting from the earth's magnetic field or it may be an artificially induced flux in which event I am able to obtain a further measurement and indication by comparing an electric current induced through the medium of such flux with the original electric current which is utilized in producing the magnetic field from which the flux was obtained and measured.

It is one important feature of the method and apparatus, contemplated by this invention, that there is no necessity for any electrical contact with the strata.

The method and apparatus contemplated by this invention may be employed in determining the location of various oil bearing strata throughout the length of a bore hole and in one modified form of the invention it can be used to very accurately locate the upper and lower boundaries of an extremely narrow oil bearing formation.

As is pointed out above, the method contemplated by this invention is dependent upon several unique characteristics of any strata or series of strata which would be traversed along the path of a bore hole. For example the measurements and indications obtained in the process contemplated by this invention are affected by the magnetic susceptibility and permeability of the strata also the eddy current and hysteresis losses in the magnetic flux passing through the strata, and in the event the magnetic field is artificially induced, my invention contemplates the observation and in some instances the recording of the wave shape distortion which is also a function of the character and contents of the strata which are being examined. The details in the method and apparatus contemplated by this invention together with other objects attending its production will be best understood from the following description of the accompanying drawings which are chosen for illustrative purposes only and in which Fig. 1 shows a sectional elevation of a bore hole and a wiring diagram of one preferred embodiment of my invention;

Fig. 2 is a diagrammatic sectional elevation illustrating one modified form of the device shown in Fig. 1;

Fig. 3 is a wiring diagram illustrating another modified form of the invention;

Fig. 4 is a wiring diagram illustrating another modified form of the invention which is designed to use the earth's magnetic field as the source of magnetic flux for obtaining measurements;

Fig. 5 is a diagrammatic plan view showing another modified form of the invention which also utilizes the lines of force in the earth's magnetic field for obtaining indications at the surface of the ground; and Fig. 6 is a diagrammatic elevation illustrating one manner in which the arrangement shown in Fig. 5 may be associated with a gyroscope for the purpose of orientation.

Figure 7 is a wiring diagram illustrating a further modification of the invention.

Referring now to the drawings, with particular reference to Fig. 1, numeral 11 indicates a section through a bore hole and the adjacent strata 12. Suspended in the bore hole 11 in predetermined geometrical relation with each other are two coils indicated by reference numerals 13 and 14. The coils 13 and 14 are electrically conductive coils provided with suitable insulation and may, if desired, be associated with magnetizable cores. The coils may be of the flat or pancake type or of the cylindrical or other type best adapted to the conditions found in any given bore-hole and as pointed out above for any given operation the coils are geometrically fixed with relation to each other by supporting them in a suitable framework or connecting them with suitable supporting means (not shown). The supporting means or framework which carries the coils may be provided with means which will permit longitudinal movement and adjustment of the coils relative to each other and also to permit rotatable adjustment of the coils relative to each other for example, the coils may be secured through the medium of apertured bosses mounted thereon to a vertical rod or shaft, the bosses being held in place by set screws or in any other suitable manner used in the art for adjustably securing a coil to a shaft.

With the arrangement shown in Fig. 1, an alternating current of suitable voltage and frequency is applied to one of the coils, 13 for example, through conductors 14, from a suitable primary source of power such as a power line, oscillator or alternator indicated generally by reference numeral 15. The electrical energy supplied to the coil 13 in this manner is effective to induce or generate a magnetic field, some of the lines of force of which will describe paths of the general character indicated at f1, to f5 inclusive. A portion of the lines of force generated in this manner after traversing the strata adjacent the bore hole will pass through the coil 14 and will generate an electromotive force in such coil the magnitude of which, for a fixed relative disposition of the coils, will depend upon the quantity of magnetic flux which has passed through the strata and on through the coil.

The quantity of flux which passes through the strata will depend upon the magnetic susceptibility of the strata and upon the total loss or absorption occurring in such strata. In other words the magnitude and electrical characteristics of the electromotive force generated or induced in the coil 14 will be governed by the character of the strata through which the lines of force have passed.

For the purpose of carrying this electromotive force to the surface of the ground and measuring its magnitude and observing its electrical characteristics, the coil 14 is provided with conductors indicated generally by reference numeral 18 which are shown as being connected through an amplifier 19 with an A. C. potentiometer 20, and oscillograph 21, and an A. C. bridge, 22. A voltmeter or millivolt meter, 23, is also shown as being connected with the circuit of conductors 18. It is to be understood that any one or all of the instruments shown may be used in obtaining a value or values indicative of the nature and character of the subsurface formation through which the two coils 13 and 14 are passing.

For example the phase relationship of the voltage or current generated in the receiving coil relative to the current or voltage applied through the sending coil 13 will vary with the nature of the losses occurring in the strata or formation in a manner somewhat analogous to the phase shift occurring in a transformer due to the hysteresis and eddy current losses in the iron core, the core in this case being the counter-part of the earth material being investigated. Furthermore, there will be a distortion of the wave shapes generated in the receiving coil 14, with reference to the corresponding wave shapes in the sending coil, such distortion being dependent upon the nature of the various losses occurring in the intervening medium. These phase relationships and the wave shapes may be obtained in the nature of a permanent record by means of the oscillograph or indications thereof may be obtained from the potentiometer 20. In this connection it will be observed that the reference side of both the potentiometer 20 and the oscillograph 21 are connected through conductors 24 and 25 respectively with the conductor 14' coming from the primary source of power.

It is well known to those familiar with the art that in the usual practice of rotary drilling a weighted mud is utilized during the drilling operation and since this mud permeates into the walls of the bore hole to a certain extent, it is preferable for most satisfactory indications as to the character of the formation, to space the coils 13 and 14 a sufficient distance apart to permit a substantial penetration of the magnetic lines of force into the formation so that they will reach the region into which the mud has not penetrated. In other words it may be desirable to separate coils 13 and 14 to the extent that coil 14 is receiving lines of force along the paths f4 and f5 which, as is clearly illustrated in Fig. 1, have penetrated much further into the formation than the lines of force f3.

In certain types of formations especially where it is desirous to locate the boundaries of a very thin oil bearing strata, for example, I may employ a variation of the coil arrangement shown in Fig. 1, such variation being illustrated in Fig. 2, in which I employ a pair of receiving coils 30 and 31 connected in series by means of conductors 18a and spaced equi-distant from the sending coil indicated by reference numeral 32. The sending coil 32 will be connected through conductor 14a to a source of power such as was described in connection with Fig. 1. The conductor 18a from the two receiving coils will be connected to a suitable amplifying and measuring or indicating instrument or instruments, of the general character described in connection with Fig. 1. With the coils 31 and 30 connected in opposition it will be seen that no indication will be received when they are both surrounded by identical strata, but this balance is immediately destroyed by any inhomogeneity in the medium or strata adjacent one of the coils. This arrangement may also be reversed and two sending coils and one receiving coil could be used.

It will be understood that the oscillator 15 or other source of energy need not necessarily be located at the surface of the ground out may be placed in a suitable container constructed for reception in the bore hole as shown in Figure 7, such container being mounted in close proximity to the sending coil in order to avoid absorption of the high frequency energy if and when this type of energy is used.

Another variation which might be employed would consist in the use of a sending coil only down the bore hole. Since the effective impedance of such a coil would change with changes in the electrical and magnetic properties of the strata traversed by the magnetic field; such changes would produce a corresponding angle of lag in the current with respect to the voltage impressed upon the coil. The distortion of the wave shape of these two quantities would be dependent upon the electric and magnetic properties of the strata, and would afford means of determining the character and nature of such strata.

Still another method of utilizing an electrically induced magnetic field in the bore hole to determine the character of subterranean formations is illustrated diagrammatically in Fig. 3. This method employs sending and receiving coils 35 and 36 respectively and includes a vacuum tube amplifier designed to greatly magnify the signal obtained from the receiving coil after which said signal is combined in an oscilloscope with the current in the sending coil which produced it. I am thus able to obtain curves equivalent to a "Hysteresis diagram" plus eddy current losses, in the intervening strata which losses at a given frequency will be proportional to the flux-density in and the resistivity of the strata being observed.

Referring again to Fig. 3 one form of circuit which may be employed in connection with the procedure just referred to is shown as comprising a source of power 37 which is connected through a variable rheostat 38 by means of conductor 39 to the sending coil 35. The circuit which includes the source of power 37 and the sending coil 35 is also connected through a pair of magnetic deflectors 39' and 39'' associated with a conventional oscilloscope generally indicated by reference numeral 40. The conductors 41 from the receiving coil are connected to a circuit which includes a resistance 41' and a condenser generally indicated 42. This resistance and capacity together with the coil 36 constitutes a form of "integrator circuit" which is connected to an amplifier 43, the amplifier in turn being connected across the deflecting plates 44 of the oscilloscope 40.

Now if the flux is varied in the strata 45 surrounding the bore hole by the sending coil 35, it will induce an electro-motive force E in the receiving coil 36 which is proportional to the rate of change in the flux. When the electromotive force so induced is applied to the integrator circuit including the resistance 41' and the condenser 42 it will be seen that when the resistance is large compared to the impedance of the condenser, the current through this circuit will be limited principally by the resistance and, therefore, will be proportional to the electro-motive force of the receiving coil. The charge on the condenser, however, is proportional to the electro-motive force across it and is, therefore, proportional to the time-integral of the current in the circuit and is in consequence proportional to the magnetic flux which has passed through the strata and into the receiving coil. The cathode ray beam of the oscilloscope, therefore, follows the flux in one direction and the magnetizing field in the other, thereby producing the closed loop or hysteresis diagram, mentioned above. These diagrams will vary for different strata and by making preliminary observations on known strata it will be seen that the data accumulated can be utilized to determine the character of an unknown subterranean formation.

In addition to the utilization of an artificially induced magnetic field within the bore hole to obtain measurements indicative of the character of the subterranean formation, my invention, as pointed out above, also contemplates the use of the magnetic lines of force of the earth's field for obtaining indications in this same respect.

Figs. 4 and 5 diagrammatically illustrate two means whereby this phase of the invention may be practiced.

Referring to Fig. 4, reference numeral 50, indicates a suitably insulated electrically conductive coil of wire of any required number of turns which is shown as being mounted upon a rotatable shaft 51 supported between bearings 52 and 53 contained in a suitable non-magnetic housing indicated by reference numeral 54. The shaft 51 is associated with means, such as an electric motor 55, whereby it may be constantly revolved at a relatively high and constant speed, such motor being shown as connected through a conductor 56 to a source of constant electrical power, generally indicated by reference numeral 57. This assembly is associated with suitable means for lowering the same down through a bore-hole and during such lowering movement the coil is rotated at a high speed through the earth's magnetic field. As the revolving coil cuts the lines of force in such field electromotive force is generated, such electromotive force being taken from the coil through the medium of a commutator or slip-ring arrangement indicated by reference numeral 58 by means of conductors 59 to the surface of the ground where it is amplified through an amplifier 60 and its magnitude measured by means of a suitable instrument such as the millivolt meter 61 or preferably a potentiometer. Since the flux-density from the earth's magnetic field in any particular strata depends upon the characteristics of such strata, it will be seen that the electromotive force generated will also vary depending upon the particular strata, and as pointed out above, by obtaining electromotive force values in a known formation or known formations, and keeping a record of such values it is possible to determine the physical characteristics of unknown formations.

Fig. 5 illustrates another form of apparatus and procedure which may be employed to determine the flux-density of subterranean formations resulting from the earth's magnetic field. This apparatus and method is based upon the principle that when an electrical coil is rotatably mounted upon a vertical axis and a small current is passed through this coil, the plane of the coil will assume a position parallel to the plane of any magnetic field in which it may be immersed. Such a coil is indicated by reference numeral 64 and is shown as being enclosed in a nonmagnetic case or housing 54; which is adapted to be lowered down a bore hole with its vertical axis in substantially parallel relation with the axis of the bore hole. Current is supplied the coil 64 by conductors 65 from a source of power 66, the circuit containing the coil being provided with a variable rheostat indicated at 67.

If, with the arrangement just described, a small torque is mechanically applied to the coil, the coil will be rotated so that its plane is offset a few degrees from the plane of the field and some other value of current will be required to reduce the angular displacement again to zero. In the device contemplated by this form of the invention the torque is shown as being applied to this coil by means of a small spiral spring indicated at 68, the outer end of which is adjustably fixed in a rigid support 68'. With the torque applied remaining constant it will also be seen that as the flux-density of the field through which the coil is passed varies, the action of the spring will be effective to rotate the coil toward or away from its position of zero displacement as the flux-density varies from the value for which this instrument was originally set.

It will thus be seen that if means are provided for obtaining an indication as to when the coil is rotated in the manner above referred to and additional means are provided for measuring the amount of current necessary to swing the coil back into parallel relation with the earth's field, that such current will give an accurate indication as to the flux-density in the region which resulted in the angular displacement above referred to. For the purpose of instantly obtaining indications at the surface of the ground of the angular displacement and the movement of the coil 64, I provide the face of the coil with a mirror indicated at 70 and project a light beam upon such mirror from a source generally indicated at 71. This light beam is reflected from the mirror to a photo-electric cell generally indicated by reference numeral 72 which in turn is connected through conductors 73 to a galvanometer, or other suitable instrument 74 located at the surface of the ground. It will thus be seen that any angular displacement of the coil 64 with respect to the earth's magnetic field resulting from the changes in the flux-density of such field will swing the light beam with respect to the photo-electric cell and give an indication on the galvanometer 74. By varying the rheostat 67 or other suitable instrument to change the current supplied to the coil 64, the coil can be swung to its neutral or original position which will also be indicated on the galvanometer and the amount of current thus applied will be a measurement commensurate with the flux-density of the strata responsible for the magnetic influence which was exerted upon the coil.

The entire unit contained in the case or housing 54'; comprising the coil 64, the spring 68, the fixed support 68' and the light and cell 71 and 72 respectively, must be constantly maintained in a predetermined oriented position during the operation of the instrument. This may be accomplished by supporting the instrument from suitable pipes or rods which are associated with means for holding them against rotation as the instrument is lowered into the well. In order to expedite the operation of the instrument, however, I prefer to attach the case 54' to a gyroscopic device of a conventional type which will operate to maintain the case in properly oriented position during its travel through the bore hole. Such an arrangement is diagrammatically illustrated in Fig. 6 where numeral 76 indicates a gyroscope suspended through a swivel connection 77 from a cable 78. The instrument case 54' is shown as being attached to the gyroscope through arms 79—79' but it is to be understood that this construction and arrangement is schematic only.

It is to be understood that while I have herein described and illustrated certain preferred procedures and certain type forms of apparatus which may be employed in the practice of the methods contemplated by this invention, that the invention is not limited to the precise methods and circuits described herein, but includes within its scope whatever changes, modifications, combinations and variations which may fairly come within the spirit of the appended claims.

I claim as my invention:

1. The method of investigating the physical characteristics of subterranean formations adjacent a bore hole which includes: artificially creating a magnetic field of force within the bore hole; influencing an electromagnetic coil, positioned in said bore hole in vertically spaced relation with the zone in which said magnetic field is created with lines of force in said field which have traversed strata surrounding a predetermined length of the bore hole; and electrically indicating the result of such influence at the surface of the ground.

2. The method of investigating the physical characteristics of subterranean formations adjacent a bore hole which includes; artificially creating a magnetic field of force within the bore hole; influencing an electromagnetic coil, positioned in said bore hole in vertically spaced relation with the zone in which said magnetic field is created with lines of force in said field which have traversed strata surrounding a predetermined length of the bore hole; electrically indicating the result of such influence at the surface of the ground; moving the source of said magnetic field and said influenced coil along the bore hole; and maintaining a substantially fixed space relationship between said source and said influenced coil during such movement.

3. The method of investigation the physical characteristics of subterranean formations adjacent a bore hole which includes: lowering into said bore hole an electrically conductive element capable of converting alternating magnetic flux in the bore hole into an electromotive force; creating an alternating field of magnetic flux in said bore hole at a substantially fixed predetermined vertically spaced distance from said converting element thereby generating an electromotive force in said element by magnetic lines of force which have traversed strata adjacent a predetermined length of the bore hole; conducting the electromotive force so generated to the surface of the ground; and utilizing said electromotive force to obtain a sensible indication commensurate with the magnetic flux-density responsible for its generation.

4. The method of investigating the physical characteristics of subterranean formations adjacent a bore hole which includes: conducting an electromotive force of predetermined magnitude into the bore hole; converting said electromotive force into a magnetic field of force within said bore hole; converting a portion of the magnetic flux so induced, which has passed through strata surrounding a predetermined length of bore hole, into a second electromotive force at a predetermined vertically spaced distance from the point at which said flux was induced; conducting said second electromotive force to the surface of the ground; and measuring the magnitude of said second electromotive force for comparison with the magnitude of said original electromotive force.

5. The method of investigating the physical characteristics of subterranean formations adjacent a bore hole which includes: conducting electric current having predetermined characteristics into the bore hole; converting said current into a magnetic field of force within said bore hole; converting a portion of the magnetic flux in said field, which has passed through strata surrounding said bore wall between predetermined spaced points in the bore hole into a second electric current; conducting said second current to the surface of the ground; and measuring the characteristics of said second current.

6. The method of investigating the physical characteristics of subterranean formations adjacent a bore hole which includes: conducting input electrical energy having predetermined characteristics into the bore hole; utilizing said input energy at a predetermined point in said bore hole to induce a magnetic field of force through the strata adjacent said bore hole; converting a portion of the magnetic flux which has traversed said strata and passed across said bore hole at a predetermined vertically spaced distance from the source of said magnetic field, into output electrical energy; conducting the output energy to the surface of the ground; and measuring the electrical characteristics of said output energy.

7. In an apparatus for investigating the physical characteristics of subterranean formations adjacent a bore hole, the combination of: a generating coil suspended in said bore hole and adapted to project a magnetic field of force through the strata adjacent said bore hole during the passage of electric current through said coil; means for applying electrical energy to said generating coil; a receiving coil suspended in said bore hole at a predetermined vertically spaced distance from said generating coil and adapted to induce electrical energy from magnetic flux in said field of force which has traversed said strata; means for conducting the induced energy from said receiving coil to the surface of the ground; and means for measuring and comparing the characteristics of the components of the induced electrical energy with those of the applied electrical energy.

8. A method of electromagnetically exploring a drill hole in the earth comprising creating a varying electromagnetic field in various positions in the drill hole to produce secondary currents and a resulting secondary electromagnetic field in the earth strata surrounding the drill hole, inducing in the drill hole currents by the secondary field, and observing the effects of the induced currents.

9. A method of electromagnetically exploring a drill hole in the earth comprising creating a varying magnetic field in various positions in the drill hole, picking up signals from the magnetic field at points removed at a substantially constant distance from the said positions and at no other points, and employing said signals to observe a characteristic of the varying magnetic field so created in the various positions in the drill hole.

10. A method of electromagnetically exploring a drill hole in the earth comprising creating a varying magnetic field in various positions in the drill hole, and adjusting effects having the frequency of the varying magnetic field and produced by said field in the various positions in the drill hole to yield values that are indicative of the differences in the surrounding geologic structure at the said various positions in the drill hole.

11. A method of exploring drill holes which comprises providing a source of energy, supplying energy from the source to create a varying magnetic field in the drill hole, receiving a signal from the field, acting upon the received signal from the source and controlling the action of the source.

12. Apparatus for exploring the geologic structure in the vicinity of a drill hole comprising a device for producing alternating current, adapted to be lowered into the drill hole, a source coil, means for supplying the coil with currents from said device, a receiver coil disposed along the drill hole in such manner that the field of said source coil will induce electromotive forces in said receiver coil, and means for observing a property or properties of said induced electromotive forces.

13. Apparatus for magnetically exploring earth strata, comprising an electromagnetic coil, means for sending an alternating current through the coil, two oppositely poled electromagnetic coils in inductive relation to the first named coil, a receiver circuit in which the two oppositely poled coils are connected, the oppositely poled coils being positioned at points such that the total voltage induced from the first named coil in the receiving circuit is normally substantially zero but is substantially different from zero when the field of the first named coil is distorted in the presence of a conducting body, and means for observing a characteristic of the current induced in the receiving circuit, said coils being adapted to be moved over various positions over earth strata to be explored.

RALPH W. LOHMAN.

CERTIFICATE OF CORRECTION.

Patent No. 2,220,788.  November 5, 1940.

RALPH W. LOHMAN.

It is hereby certified that error appears in the printed specification of the above numbered patent requiring correction as follows: Page 4, second column, line 26, claim 3, for the word "investigation" read --investigating--; line 69, claim 5, for "wall" read --hole--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.